United States Patent
Ko et al.

(10) Patent No.: US 8,208,465 B2
(45) Date of Patent: Jun. 26, 2012

(54) APPARATUS AND METHOD FOR CONTROLLING MULTICAST IN MULTI HOP NETWORKS

(75) Inventors: Seokkap Ko, Gwangju (KR); Ilkyun Park, Seoul (KR); Nac Woo Kim, Gwangju (KR); Byung-Tak Lee, Gyeonggi-do (KR); Jai Sang Koh, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 278 days.

(21) Appl. No.: 12/652,818

(22) Filed: Jan. 6, 2010

(65) Prior Publication Data

US 2011/0080908 A1  Apr. 7, 2011

(30) Foreign Application Priority Data

Oct. 7, 2009 (KR) ........................ 10-2009-0094998

(51) Int. Cl.
*H04L 12/28* (2006.01)
*H04L 12/56* (2006.01)
*H04L 1/00* (2006.01)
*H04L 12/26* (2006.01)
*H04J 3/26* (2006.01)

(52) U.S. Cl. .................. 370/390; 370/235; 370/432
(58) Field of Classification Search .......... 370/235, 370/390, 432
See application file for complete search history.

(56) References Cited

U.S. PATENT DOCUMENTS

| | | | |
|---|---|---|---|
| 2006/0015928 A1* | 1/2006 | Setty et al. | 725/148 |
| 2006/0146730 A1 | 7/2006 | Zeng et al. | |
| 2006/0146823 A1* | 7/2006 | Ding | 370/390 |
| 2007/0002858 A1 | 1/2007 | Bichot et al. | |
| 2009/0293093 A1* | 11/2009 | Igarashi | 725/115 |

FOREIGN PATENT DOCUMENTS

| | | |
|---|---|---|
| KR | 1020070095998 A | 10/2007 |
| KR | 1020070117571 A | 12/2007 |
| KR | 1020080005533 A | 1/2008 |
| KR | 1020090003582 A | 1/2009 |
| KR | 1020090004243 A | 1/2009 |

OTHER PUBLICATIONS

Yunjung Yi, et al; "On-Demand Multicast Routing Protocol (ODMRP) for Ad Hoc Networks", IETF MANET Working Group, Internet-Draft, draft-ietf-manet-odmrp-04.tst, Feb. 2003 (No exact date given).

Elizabeth M. Royer, et al; "Multicast Operation of the Ad-hoc On-Demand Distance Vector Routing Protocol", Proc. of 5th ACM/IEEE Annual Conf. on Mobile Computing and Networking, pp. 207-218, Aug. 1999 (exact date not given).

* cited by examiner

*Primary Examiner* — Ronald Abelson
(74) *Attorney, Agent, or Firm* — Ladas & Parry LLP

(57) ABSTRACT

Disclosed is a multicast controlling apparatus and method in a multi hop network. The multicast controlling apparatus in the multi hop network includes a packet determining unit to receive a packet from a group management query device or a station, and to determine whether the received packet is a group management protocol packet, a packet type distinguishing unit to distinguish a type of the received packet when the received packet is determined as the group management protocol packet, and a packet transmitting unit to transmit the packet to a second port excluding a first port that receives the query message, when the received packet is determined as the query message.

14 Claims, 4 Drawing Sheets

APPARATUS AND METHOD FOR CONTROLLING MULTICAST IN MULTI HOP NETWORKS

CROSS-REFERENCE TO RELATED APPLICATION

This application claims the benefit of Korean Patent Application No. 10-2009-0094998, filed on Oct. 7, 2009, in the Korean Intellectual Property Office, the disclosure of which is incorporated herein by reference.

BACKGROUND

1. Field of the Invention

The present invention relates to a multicast controlling apparatus and method in multi hop networks, and more particularly, to a multicast controlling apparatus and method that is effective, reliable, and capable of supporting multicast in multi hop networks.

2. Description of the Related Art

A multi hop network apparatus may be constituted by a mesh router and a mesh client, namely, a station. Here, the mesh router is connected with another mesh router, a mesh client, or a wired network, and relays a message between the connection.

The mesh router may perform a similar function as a bridge in network equipment. Generally, the network equipment constituted by bridges may use a spanning tree protocol (STP) to prevent a loop. Also, the network equipment constituted by bridges may use an Internet group management protocol (IGMP) snooping to effectively support multicast.

However, when a conventional method is applied to the multi hop network apparatus, various problems may occur.

As an example, according to the conventional method, a group management message may be transmitted based on a tree generated by the STP. That is, the group management message is not transmitted to a port that is blocked by the SPT. Accordingly, the group management message is transmitted based on the tree generated by the STP in a multicast transmission route generate by an IGMP snooping. However, the tree generated by the STP is formed centering around a single route bridge, and the tree is not optimized for a multicast router or a multicast source, thereby not being optimized for multicast transmission route.

Also, when a multicast frame is transmitted in a wireless network, unlike the wired network, a loss may occur. That is, in the conventional method, when the group management message is transmitted based on multicast, a packet loss may occur, and thus, a new station may not receive the multicast or the reception may be delayed. Also, there is a problem that it takes a significant amount of time, when the station leaves.

In addition, the conventional method defines a separate protocol for the wireless network, and thus, there may be problems in that the conventional method is dependent upon a specific unicast routing protocol, the conventional method is not compatible with existing equipment and an application program to embody the specific unicast routing protocol is complex, the group management message is inconsistent, the conventional method is not applicable to a 2-layer based wired network environment, and the like.

SUMMARY

An aspect of the present invention provides a multicast controlling apparatus and method that transmits a query message of a group management protocol packet to an entire network, prevents a loop when a tree is formed, and optimizes a multicast transmission route based on the tree.

Another aspect of the present invention also provides a multicast controlling apparatus and method that transmits a packet based on a unicast transmission method, and thus improves a transmission rate and reliability.

Another aspect of the present invention also provides a multicast controlling apparatus and method that transmits a query message to a new station to promptly join a multicast transmission route, and thus, the new station quickly receives a multicast packet, when the new station performs association.

According to an aspect of the present invention, there is provided an apparatus of controlling a multicast in a multi hop network, the apparatus including a packet determining unit to receive a packet from a group management query device or a station, and to determine whether the received packet is a group management protocol packet, a packet type distinguishing unit to distinguish a type of the received packet when the received packet is determined as the group management protocol packet, and a packet transmitting unit to transmit the packet to a second port excluding a first port that receives a query message, when the received packet is determined as the query message.

According to another aspect of the present invention, there is provided a method of controlling a multicast in a multi hop network, the method including determining whether a packet received from a group management query device or a station is a group management protocol packet, distinguishing a type of the received packet, when the received packet is the group management protocol packet as a result of the determination, and transmitting the packet to a second port excluding a first port that receives a query message, when the received packet is the query message as the result of the determination.

Additional aspects, features, and/or advantages of the invention will be set forth in part in the description which follows and, in part, will be apparent from the description, or may be learned by practice of the invention.

EFFECT

According to exemplary embodiments of the present invention, a query message of a group management protocol packet is transmitted to an entire network, and a loop is prevented when a tree is formed, and thus, a multicast transmission route based on the tree is optimized.

According to exemplary embodiments of the present invention, a packet is transmitted based on a unicast transmission method, and thus a transmission rate and reliability is improved.

According to exemplary embodiments of the present invention, a query message is transmitted to a new station to enable the new station to promptly join a multicast transmission route, and thus, the new station quickly receives a multicast packet, when the new station performs association.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
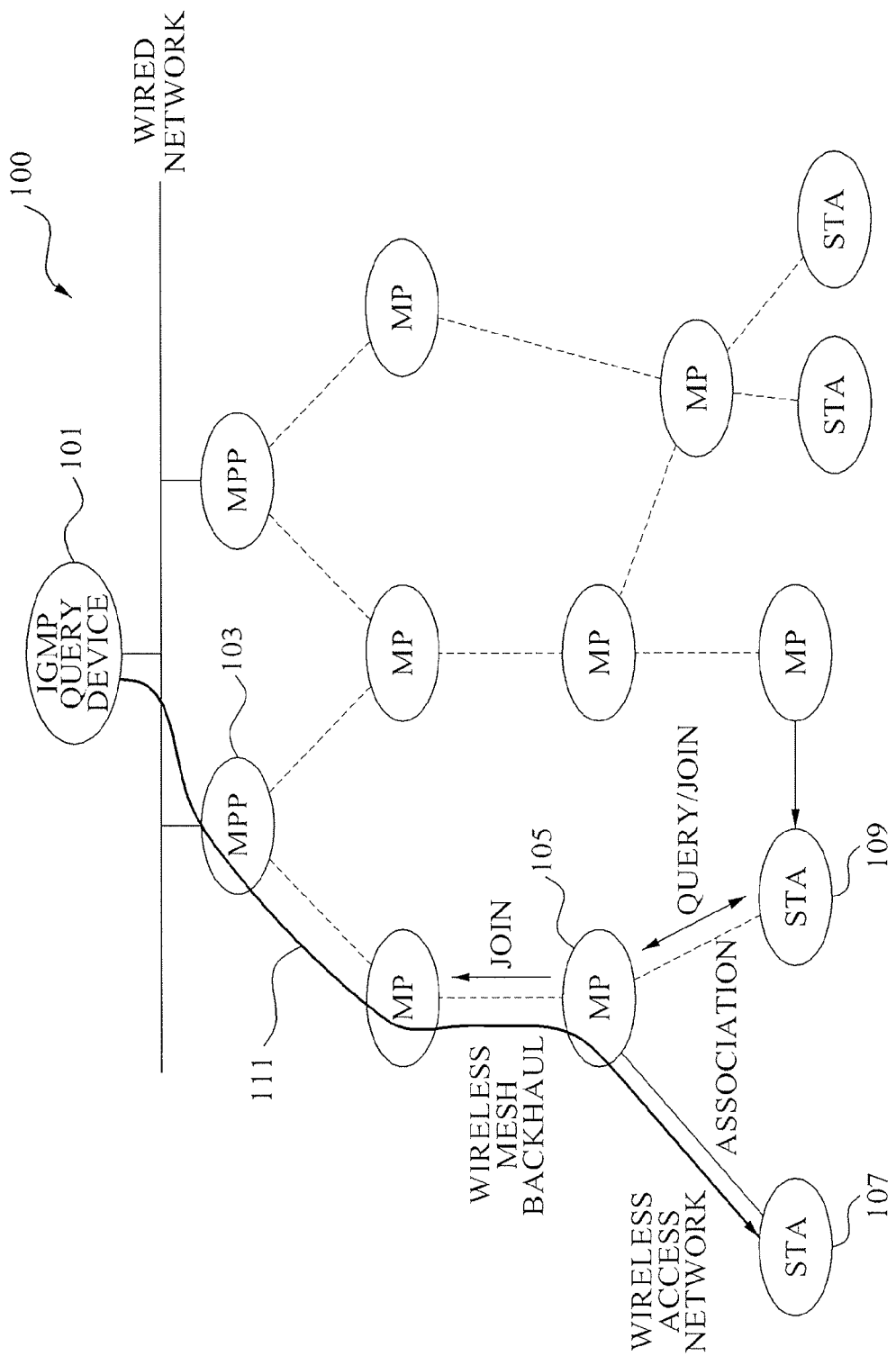
FIG. 1 is a diagram illustrating a configuration of a multi hop network apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a multicast controlling apparatus and method in a multi hop network according to an exemplary embodiment of the present invention will be described in detail with reference to attached drawings. Here, although the multicast controlling apparatus in the multi hop network according to an exemplary embodiment of the present invention may communicate based on a group management protocol, as an example, an Internet group management protocol (IGMP), the multicast controlling apparatus may not be limited thereto.

FIG. 1 is a diagram illustrating a configuration of a multi hop network apparatus according to an exemplary embodiment of the present invention.

Referring to FIG. 1, the multi hop network apparatus 100 according to an exemplary embodiment of the present invention includes a group management query device (IGMP query device) 101, a mesh point portal (MPP) 103, a mesh point (MP) 105, and a station 107.

The IGMP query device 101 may be a multicast router or a multicast source, and may periodically generate an IGMP query message to search for nodes, namely stations, that intend to join or are currently joined in the group. Also, the IGMP query device 101 may transmit a multicast packet.

The MPP 103 is a mesh gateway, and thereby transmits a packet between the IGMP query device 101 and the MP 105. Here, the MMP 103 is connected to the IGMP query device 101 based on a wired network, and may be connected with the MP 105 based on a wireless network, and the connection is not limited thereto.

The MP 105 may be a mesh router, and may form a wireless mesh backhaul by constructing a wireless connection between wireless points. Also, the MP 105 may be connected with a mesh client, namely, the station 107, and thus perform transmission of a packet between the MMP 103 and the station 107. That is, when the MMP 105 receives a join message from the station 107 in response to transmission of IGMP query message, the MMP 105 may transmit a multicast packet to the station 107 that transmits the join message to form a multicast transmission route.

The station 107 may associate with an access point of the MP 105 and may perform transmission/reception of packet with the MP 105. In this instance, a network between the station 107 and the MP 105 may be a wireless access network.

Figure 2:
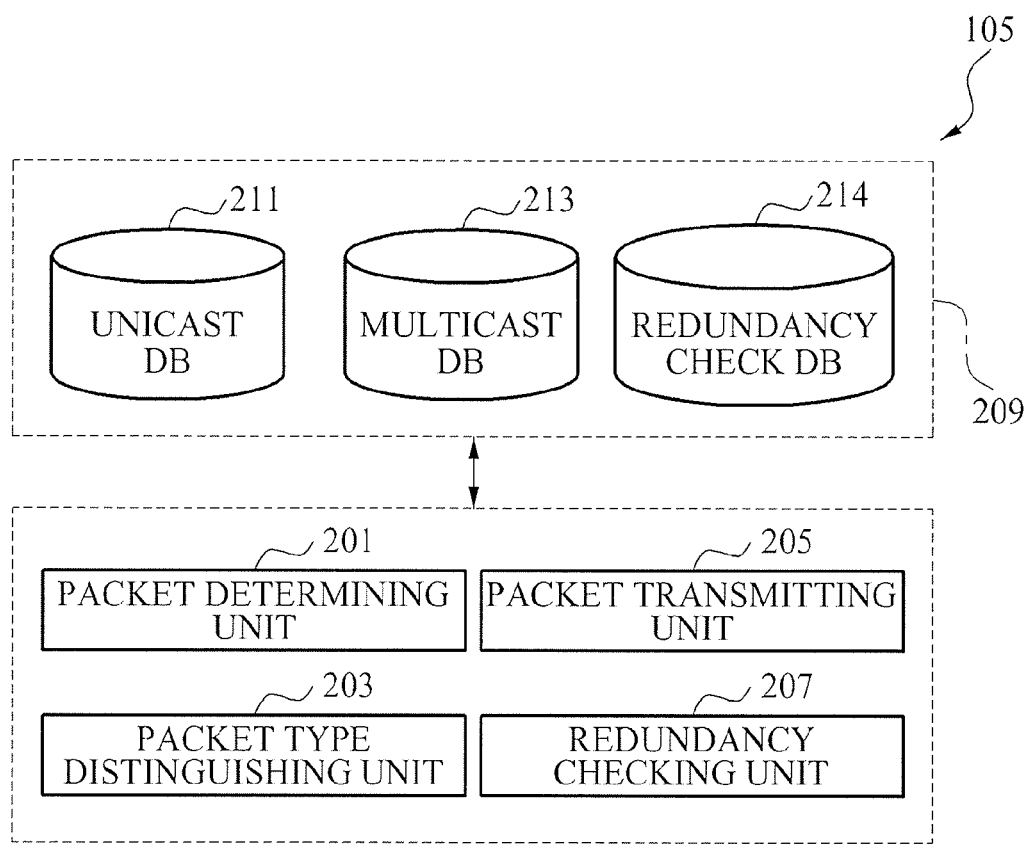
FIG. 2 is a diagram illustrating a configuration of a multicast controlling apparatus in a multi hop network according to an embodiment of the present invention.

FIG. 2 is a diagram illustrating a configuration of the multicast controlling apparatus 105 in a multi hop network according to an embodiment of the present invention. Here, the multicast controlling apparatus 105 in the multi hop network according to an exemplary embodiment of the present invention may be the MP 105 of FIG. 1.

Referring to FIGS. 1 and 2, the multicast controlling apparatus 105 includes a packet determining unit 201, a packet type distinguishing unit 203, a packet transmitting unit 205, a redundancy checking unit 207, and a database 209.

The packet determining unit 201 may receive a packet from the IGMP query device 101 or the station 107, and may determined whether the received packet is an IGMP packet, a general unicast packet, or a multicast packet.

The packet type distinguishing unit 203 may distinguish a type of the received packet, when the received packet is determined as the IGMP packet. That is, the packet type distinguishing unit 203 may distinguish whether the received packet is a query message, a join message or a leave message, when the received packet is determined as the IGMP packet.

When the received packet is determined as a query message received from the IGMP query device 101, the packet transmitting unit 205 may transmit the received packet to a second port excluding a first port that receives the query message. Here, unlike the conventional method, the packet transmitting unit 205 may transmit the packet even to a port that is blocked by a spanning tree protocol (STP), thereby enabling an optimized multicast tree to be constructed. Also, the packet transmitting unit 205 may transmit the packet based on a unicast transmission method, thereby improving a transmission rate and a reliability.

When the received packet is determined as a join message received from the station 107, the packet transmitting unit 205 may record, in a multicast database 213, a join port that receives the packet and may transmit the packet to the first port that receives the query message. In this instance, the packet transmitting unit 205 may transmit the packet based on the unicast transmission method, and may improve a transmission rate and a reliability. Also, the packet transmitting unit 205 may transmit a single join message to the first port, when a plurality of join messages are received from the station 107.

Here, the packet transmitting unit 205 records, in the multicast database 213, the join port that receives the join message and the station 107 that receives the join message, thereby enabling only the join port that receives the join message to be included in a multicast transmission route 111.

Also, when the received packet is determined as a leave message received from the station 107, the packet transmitting unit 205 may delete, from a multicast group member of the multicast database 213, the station 107 that transmits the packet, and may transmit the packet to the first port that receives the query message. In this instance, the packet transmitting unit 205 may delete, from the multicast database 213, the leave port that receives the packet, when the multicast group member that is connected with the port that receives the packet does not exist.

The packet transmitting unit 205 may transmit a query message to a port that is connected with a new station 109 regardless of whether the query message transmitted by the IGMP 101 is received, as a station that communicates with another multicast controlling apparatus moves and performs association with the multicast controlling apparatus as the new station 109. Accordingly, when the packet transmitting unit 205 receives, from the new station 109, a join message in response to the query message, the join port that receives the join message may be recorded in the multicast database 213, and subsequently, the packet transmitting unit 205 may promptly transmit a multicast packet to the new station 109.

The packet transmitting unit 205 may search for a destination port based on a unicast database 211 or the multicast database 213, when the received packet is not the IGMP packet, and may transmit the received packet to the retrieved destination port.

Particularly, the packet transmitting unit 205 may record, in the unicast database 209, a second layer address of a transmitter of the packet, as an example, a second layer address of the station, and a port of the station, when the received packet is the unicast packet as opposed to the IGMP packet. Also, the packet transmitting unit 205 may search for a destination port from the unicast database 211, and may transmit the received packet to the destination port based on the unicast transmission method, when the destination of the received packet is the second layer address of the transmitter recorded in the unicast database 211. In this instance the unicast packet is a 2-layer frame.

The packet transmitting unit 205 may search for the destination port from the multicast database 213, and may transmit the received packet to the destination port based on a multicast transmission method, when the received packet is not the IGMP packet, and is the multicast packet. That is, the packet transmitting unit 205 may transmit the packet to the station that transmits the join message, and may not transmit the packet to the station that does not transmit the join message, and thus, an optimized multicast transmission route 111 may be constructed.

In this instance, the multicast packet may be a 3-layer frame. Also, there may be a plurality of destination ports and the plurality of destination ports may be managed by the multicast database 213 as a multicast group member.

Also, the packet transmitting unit 205 may transmit the packet to the first port that receives the query message, when the destination port is not retrieved from the multicast database 213.

The redundancy checking unit 207 may check a redundancy of the IGMP packet based on the redundancy check database 209. In this instance, the redundancy check database 207 may determine that the received packet is redundant when a packet that is identical with the received packet is retrieved from the redundancy check database 209.

That is, the redundancy checking unit 207 may delete the redundantly received packet and may record, in the redundancy check database 209, a packet that is not redundantly received.

Accordingly, the redundancy checking unit 207 may check the redundancy of the packet and discards the redundantly received packet, thereby preventing a loop while a tree is formed.

The database 209 may include unicast database 211, the multicast database 213, and the redundancy check database 214.

The unicast database 211 may record the destination port of the packet that is transmitted based on the unicast transmission method.

The multicast database 213 may record, as a multicast group member, the destination port of the packet that is transmitted based on the multicast transmission method. The multicast group member may further include a second layer address of a transmitter that transmits a join packet.

The redundancy check database 209 may record the IGMP packet and may record a packet that is first received within a predetermined time to check redundancy. In this instance, the redundancy check database 209 may maintain the packet during the predetermined time or may maintain a predetermined amount of packets.

Figure 3:
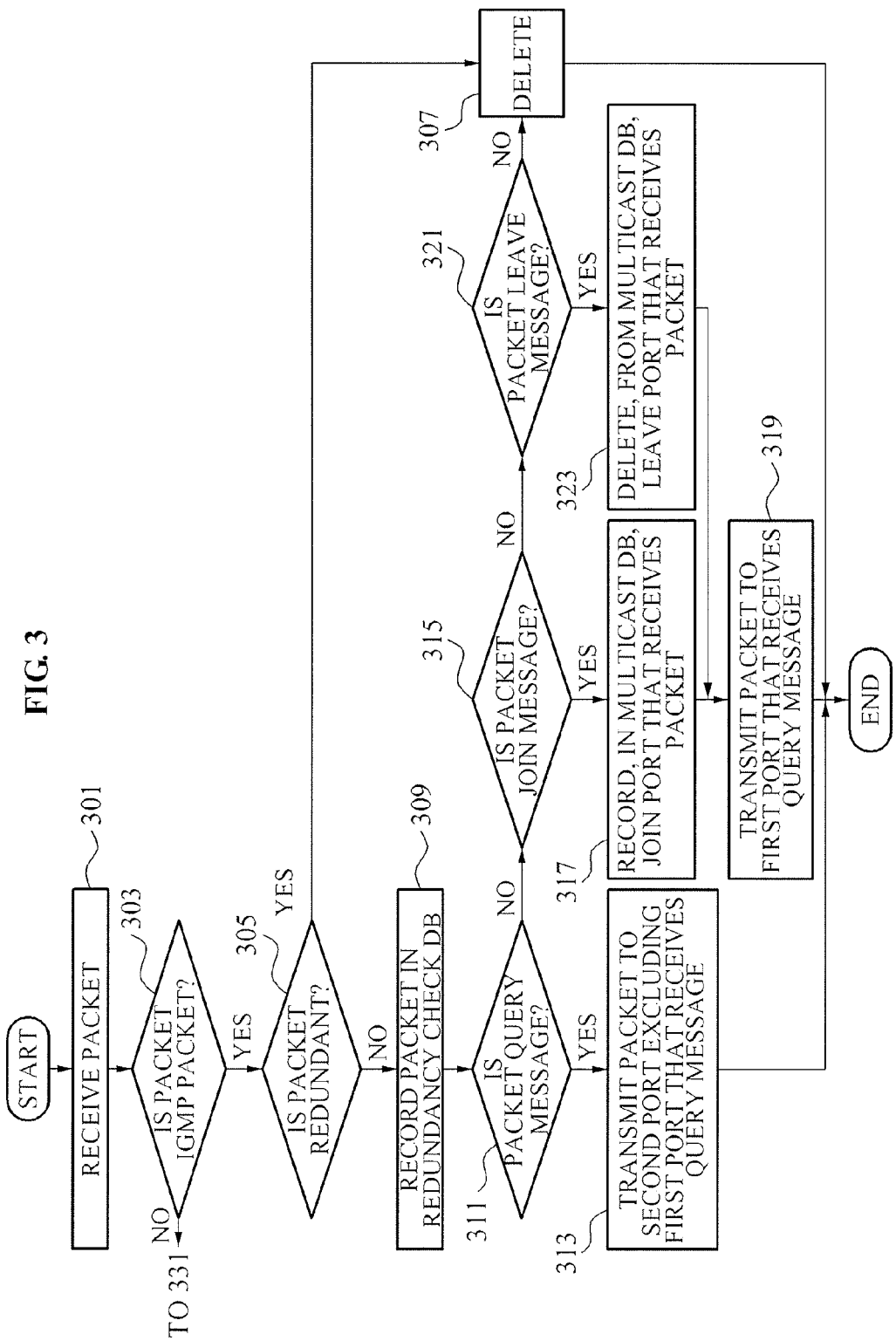
FIGS. 3 and 4 are flowcharts illustrating a multicast controlling method in a multi hop network according to an embodiment of the present invention.
Figure 4:
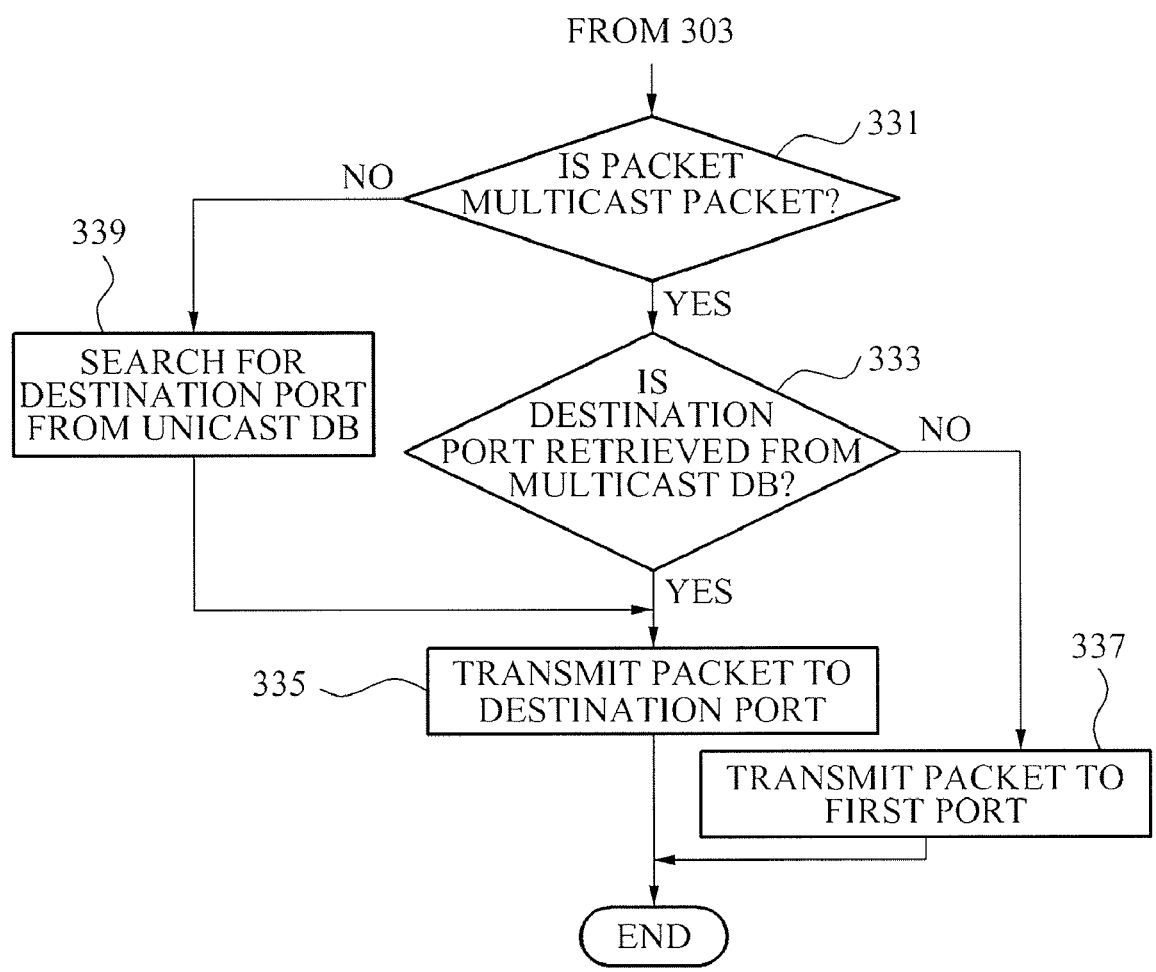

FIGS. 3 and 4 are flowcharts illustrating a multicast controlling method in a multi hop network according to an embodiment of the present invention.

Referring to FIGS. 3 and 4, the multicast controlling apparatus receives a packet in operation 301 and determines whether the received packet is an IGMP packet in operation 303.

In this instance, the multicast controlling apparatus may receive the packet from an IGMP query device or a station.

Next, the multicast controlling apparatus checks a redundancy of the received packet, when the received packet is determined as the IGMP packet in operation 305.

When a packet that is identical to the received packet is retrieved from the redundancy check database in operation 307, the multicast controlling apparatus may determine that the received packet is redundant and deletes the received packet.

Conversely, the multicast controlling apparatus may record the received packet in the database, when the received packet is not redundant in operation 309.

Here, the multicast controlling apparatus may check the redundancy of the packet, and thus prevents a loop while a tree is formed.

Next, the multicast controlling apparatus distinguishes a type of the received packet.

Particularly, the multicast controlling apparatus may distinguish whether the received IGMP packet is a query message, a join message, or a leave message.

That is, when the received packet is determined as the query message in operation 311, the multicast controlling apparatus may transmit the received packet to a second port excluding a first port that receives the query message in operation 313.

In this instance, the multicast controlling apparatus transmits the packet based on a unicast transmission method, and thus improves a transmission rate and reliability.

Also, the multicast controlling apparatus may transmit the query message to a port that is connected with a new station regardless of whether the query message transmitted by the IGMP query device is received, as a station that communicates with another multicast controlling apparatus moves and performs association as the new station 109. Next, when the multicast controlling apparatus receives, from the new station, a join message in response to the query message, the multicast controlling apparatus records, in the multicast database, a join port that receives the join message, thereby promptly transmitting a multicast packet to the new station.

Also, the multicast controlling apparatus may record, in the multicast database, the join port that receives the packet in operation 317, when the received packet is determined as the join message in operation 315. Subsequently, the multicast controlling apparatus may transmit the packet to the first port that receives the query message in operation 319.

Also, when the received packet is determined as a leave message in operation 321, the multicast controlling apparatus may delete a transmitter, namely a station, of a leave message, from a multicast group member, and may delete a leave port that receives the packet from the multicast database when a multicast group member that connected with the port that receives the packet does not exist in operation 323. Subsequently, the multicast controlling apparatus may transmit a packet to the first port that receives the query message in operation 319.

Next, when the determining in operation 303 determines that the received packet is not the IGMP packet, the multicast controlling apparatus may search for a destination port from the unicast database or the multicast database, and may transmit the received packet to the retrieved destination port.

That is, when the received packet is a multicast packet as opposed to the IGMP packet as determined in operation 331, the multicast controlling apparatus may search for a destination port from the multicast database in operation 333, and may transmit the received packet to the destination port based on the multicast transmission method in operation 335. In this instance, when the destination port is not retrieved from the multicast database and the multicast controlling apparatus does not receive the packet from the first port that receives the query message, the multicast controlling apparatus may transmit a predetermined packet to the first port in operation 337.

Also, when the received packet is a unicast packet as opposed to the IGMP packet as determined in operation 331, the multicast controlling apparatus may search for the destination port from the unicast database and may transmit the received packet to the destination port based on the unicast transmission method in operation 339.

The method and apparatus according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus of controlling a multicast in a multi hop network, the apparatus comprising:
a packet determining unit to receive a packet from a group management query device or a station, and to determine whether the received packet is a group management protocol packet;
a packet type distinguishing unit to distinguish a type of the received packet when the received packet is determined as the group management protocol packet; and
a packet transmitting unit to transmit the packet to a second port excluding a first port that receives the query message, when the received packet is determined as the query message,
wherein, when the received packet is determined as a join message, the packet transmitting unit records, in a multicast database, a join port that receives the packet, and transmits the packet to the first port that receives the query message.

2. The apparatus of claim 1, further comprising:
a redundancy checking unit to determine a redundancy of the group management protocol packet based on a redundancy check database, to delete a redundantly received packet, and to record, in the redundancy check database, a packet that is not redundantly received.

3. The apparatus of claim 1, wherein, when the received packet is determined as a leave message, the packet transmitting unit deletes, from a multicast database, a leave port that receives the packet, and transmits the packet to the first port that receives the query message.

4. The apparatus of claim 1, wherein the packet transmitting unit transmits the query message to a port that is connected with a new station regardless of whether the packet is received, as the new station performs association.

5. The apparatus of claim 1, wherein the packet transmitting unit transmits the packet based on a unicast transmission method.

6. The apparatus of claim 1, wherein, when the received packet is determined as a multicast packet as opposed to the group management protocol packet, the packet transmitting unit searches for a destination port from the multicast database, and transmits the received packet to the retrieved destination port.

7. The apparatus of claim 6, wherein the packet transmitting unit transmits the packet to the first port that receives the query message when the destination port is not retrieved from the multicast database.

8. A method of controlling a multicast in a multi hop network, comprising:
determining whether a packet received from a group management query device or a station is a group management protocol packet;
distinguishing a type of the received packet, when the received packet is the group management protocol packet as a result of the determination;
and transmitting the packet to a second port excluding a first port that receives the query message, when the received packet is the query message as the result of the determination, further comprising:
recording, in a multicast database, a join port that receives the packet when the received packet is a join message as the result of the determination, and transmitting the packet to the first port that receives the query message.

9. The method of claim 8, further comprising: checking a redundancy of the group management protocol packet;
and when a packet that is identical to the received packet is retrieved from a redundancy check database, deleting the received packet, and
when the packet that is identical to the received packet is not retrieved from the redundancy check database, recording the received packet in the redundancy check database.

10. The method of claim 8, further comprising:
deleting a leave port that receives the packet when the received packet is a leave message, and transmitting the packet to the first port that receives the query message.

11. The method of claim 8, further comprising:
transmitting a query message to a port that is connected to a new station regardless of whether the packet is received, when the new station performs association.

12. The method of claim 8, wherein the transmitting of the packet comprises:
transmitting the packet based on a unicast transmission method.

13. The method of claim 8, further comprising:
searching for a destination port from a multicast database, when the received packet is a multicast packet as opposed to the group management protocol packet;
and transmitting the received packet to the destination port.

14. The method of claim 13, further comprising:
transmitting the packet to the first port when the destination port is not retrieved from the multicast database.

* * * * *